United States Patent [19]
Monck

[11] Patent Number: 5,881,469
[45] Date of Patent: Mar. 16, 1999

[54] MEASURING AND INSTRUCTIONAL RULER

[76] Inventor: Donna L. Monck, 545 Carpentersville Rd., Phillipsburg, N.J. 08565

[21] Appl. No.: 812,529

[22] Filed: Mar. 7, 1997

[51] Int. Cl.[6] .............................. G01B 3/02; G09B 19/02; G09B 23/02

[52] U.S. Cl. ................................ 33/494; 33/491; 434/195

[58] Field of Search .............................. 33/494, 491, 1 B, 33/1 BB, 1 AA, 483, 484, 493, 758, 760, 562, 563, 566; 434/188, 195, 196, 207

[56] References Cited

U.S. PATENT DOCUMENTS

| | | | |
|---|---|---|---|
| 396,381 | 1/1889 | Yaggy | 434/269 |
| 569,358 | 10/1896 | Sommerfeldt | 33/491 |
| 1,174,689 | 3/1916 | Coleman | 434/196 |
| 1,776,245 | 9/1930 | Barrett | 33/494 |
| 2,926,432 | 3/1960 | Helberg | 434/196 |
| 2,930,146 | 3/1960 | Casel | 434/196 |
| 4,144,657 | 3/1979 | Dumovich | 434/195 |
| 4,547,969 | 10/1985 | Haack | 33/494 |
| 4,778,390 | 10/1988 | Marans | 434/196 |

*Primary Examiner*—Christopher W. Fulton

[57] ABSTRACT

A measuring and instructional ruler device is provided for use by children and persons during the instruction of linear measurement, and for use in the measuring and drawing of objects. The device is comprised of a base panel having a top surface having standard units of measure delineated thereon, and at least one transparent sheet having fractional increments of the same standard unit of measure delineated thereon, wherein the transparent sheet is positionable over the base panel so that the delineated fractional increments of the standard unit of measure may be aligned with the delineated standard units of measure to demonstrate the relationship between the unit of measure and the fractional increments thereof.

11 Claims, 4 Drawing Sheets

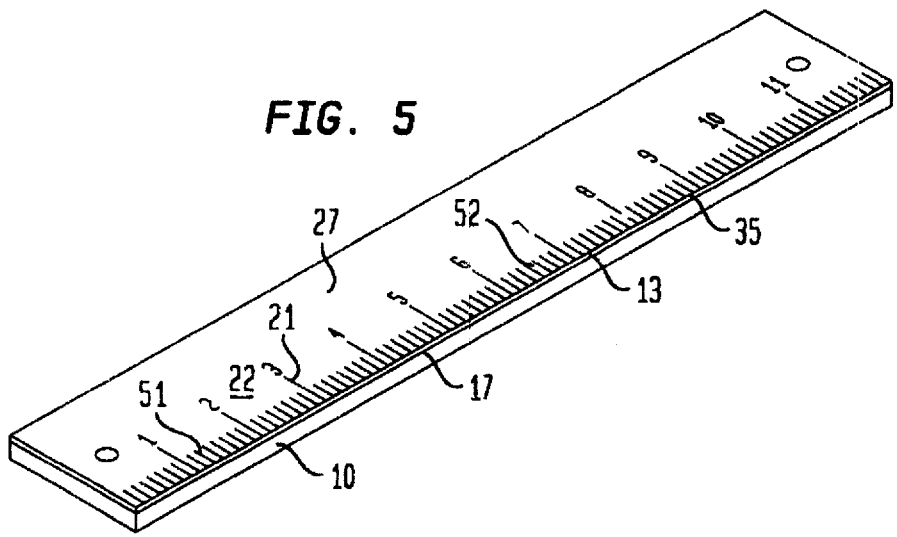
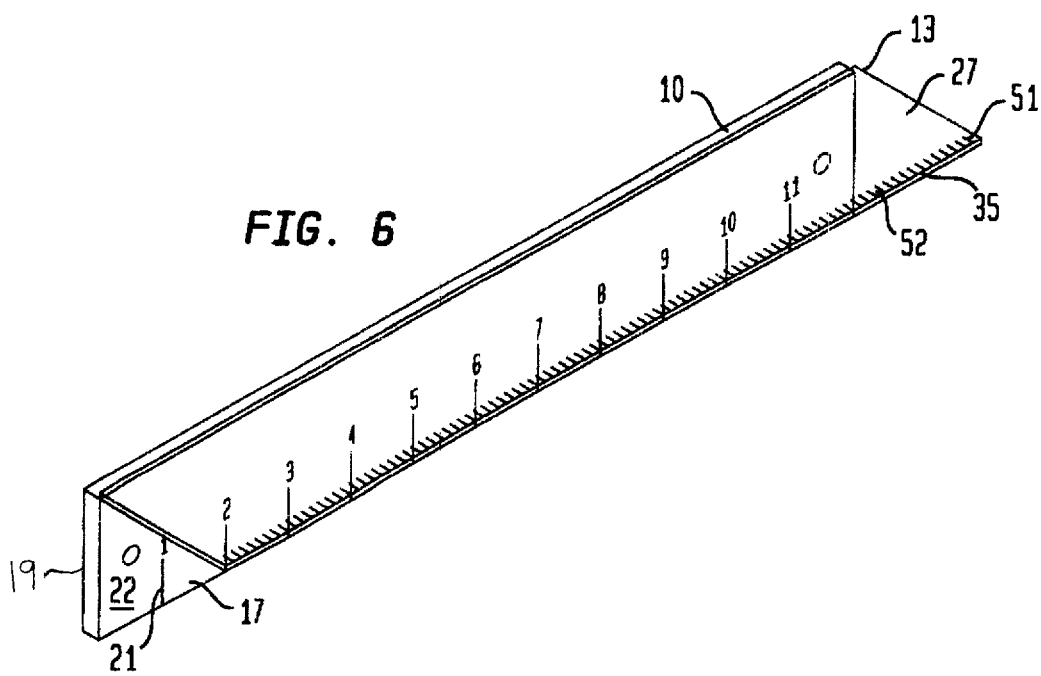

MEASURING AND INSTRUCTIONAL RULER

BACKGROUND OF THE INVENTION

This invention concerns a ruler device for use in measuring distance, for use in measuring and the construction of linear objects, for use during the instruction of linear measurement, and for use as an instrument to demonstrate the relationship between a said unit of measure and fractional increments of said standard unit of measure.

The concept of fractional increments of standard units of measure can be demonstrated by abstract or mathematical approaches when accompanied by visual indica. The standard scale markings on a conventional ruler are not easily comprehended by children or persons. Young children and persons, especially those with learning impediments, have difficulty with the perception of fractional increments of a said unit of measure on a conventional ruler. For example, after the concept of ½", fourths of and inch, eighths of an inch have been presented persons, especially young children, have difficulty with the perception of the relationship between the fractional incremental markings since one indicum denotes one half inch, two fourths, four eighths, and eight sixteenths of an inch.

Also due to the fact that the fractional incremental markings on a standard ruler are of the same color, it is difficult for the learner to distinguish the markings.

Although the fractional incremental markings on a standard ruler may be of gradually decreasing length which denote the decreasing size of the fractional increment, the lines of one color are not easily described to the learner. For example, when presenting the one inch mark, one states the longest lines are the inch marks. Then when presenting the one half inch mark, one states the next shorter lines are the one half inch marks. Next, when presenting the one fourth inch marks, the problem begins to present itself. If the instructor says the shorted lines are the one fourth inch lines, the learner becomes confused. The term "shorter" is now applied to more than one set of indica. The problem becomes even more severe when the instructor presents the eighth and sixteenth inch indica. This problem is alleviated with each of the fractional incremental indica being different colors, presented independently and then aligned on top of each other. Said standard unit of measure and the fractional increments thereof are easily distinguished.

U.S. Pat. No. 4,614,042 to Maurer discloses an educational device for use by children and persons having learning impediments or physical handicaps. While the Maurer device provides a means for perceiving a fraction of an inch, it only shows a fraction of an inch as an extension of an inch at a given point on the device. It does not uniformly demonstrate the fractional increments throughout the entire length of the instrument. It also does not simultaneously demonstrate the relationship amongst the various fractional increments throughout the entire length of the device. Furthermore, it does not disclose the fact that the incremental markings denote multiple fractional increments of said standard unit of measure. Example: the one half inch indica is also the two fourth, four eighth and eight sixteenth inch indica. The Maurer device, while demonstrating a fractional part of one inch, does not demonstrate the fractional parts of twelve inches simultaneously. The Maurer device, while being a teaching aid for students, by design, would preclude its wide spread use as a measuring device for the general populace.

It is accordingly a object of this invention to provide a ruler comprising functionally symbolic means to aid in the distinguishing of a said standard unit of measure and its said fractional increments for wide spread use amongst students and the general populace.

It is another object of this invention to provide a ruler device for the measuring of distance and objects and to use when drawing.

It is a further object of this invention to provide an educational tool which will facilitate in the instruction for use of conventional rulers.

It is still another object of this invention to provide a ruler of the aforesaid nature of sufficient construction and low cost that it may find wide spread use amongst educators and persons.

These objects and advantages of this invention will be apparent from the following description.

SUMMARY OF THE INVENTION

The above and other beneficial objects and advantages are accomplished in accordance with the present invention by a measuring and instructional ruler comprised of:

base panel having a top surface, having a standard unit of measure delineated thereon; and at least one transparent sheet having fractional increments of said standard units of measure delineated thereon;

wherein said transparent sheet is positionable over said base panel so that said delineated fractional increments of said standard unit of measure are aligned with said delineated unit of measure indica to demonstrate the relationship between said unit of measure and the fractional increments thereof.

Said ruler can be used to measure distance between two points, to measure objects, or in the construction of a linear object. Said base panel may be used independently, or said transparent sheets may be positioned over said base panel so that delineated fractional increments of said unit of measure are aligned. Said ruler can then be used to measure distance, construct linear figures, and measure objects to said fractional increment of said unit of measure.

Said instructional ruler can be used as an educational tool to facilitate in the instruction of use of conventional rulers. Said ruler can be utilized as a demonstrational tool or as a measuring device in all circumstances which call for a measuring device such as elementary schools, technical schools, trade schools, prison, adult, and abilities educational programs or in any situation where there is a need for a ruler.

BRIEF DESCRIPTION OF THE DRAWING

For a fuller understanding of the nature and objects of this invention, reference should be had to the following detailed description taken in connection with the accompanying drawing forming a part of this specification and in which similar numerals of reference indicate corresponding parts in all the figures of the drawings:

FIG. 5 is a top plan view of a further alternative embodiment of said base panel from FIG. 1 and said transparent sheet 2d of FIG. 2.

FIG. 6 is and alternative exploded view of said ruler of this invention in operative mode using the components of FIG. 1 and 2d from FIG. 2.

DESCRIPTION OF THE PREFERRED EMBODIMENT

Figure 1:
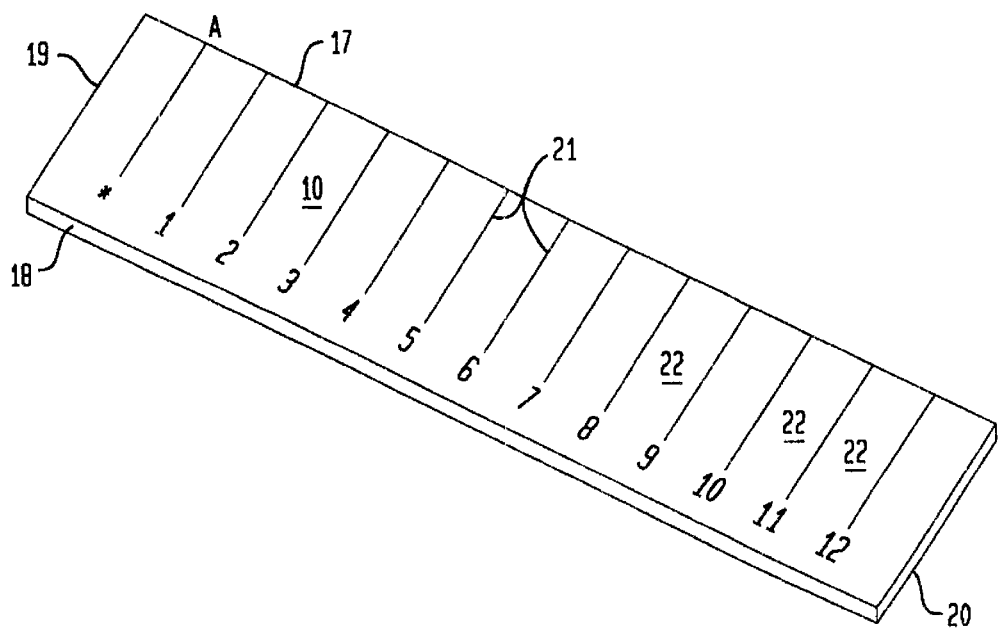
FIG. 1 is a top plan view embodiment of said base panelcomponent of a ruler of this invention.
Figure 2A:
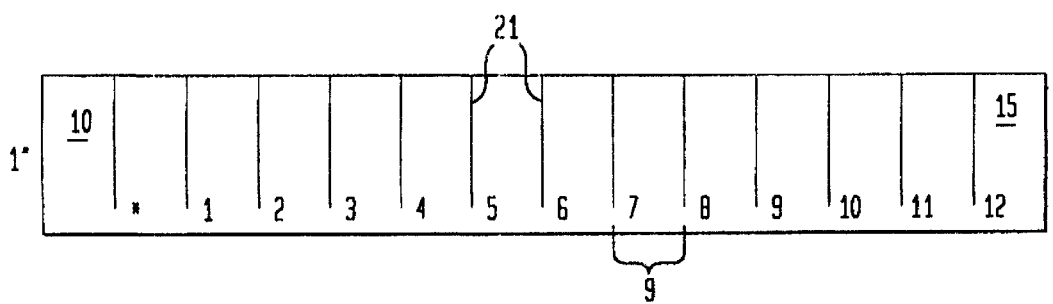
FIG. 2a–2e is a top plan view of said base panel and four transparent sheets which are positionable over the base panel so that standard unit of measure indica are aligned with fractional incremental indica of standard unit of measure.
Figure 2B:
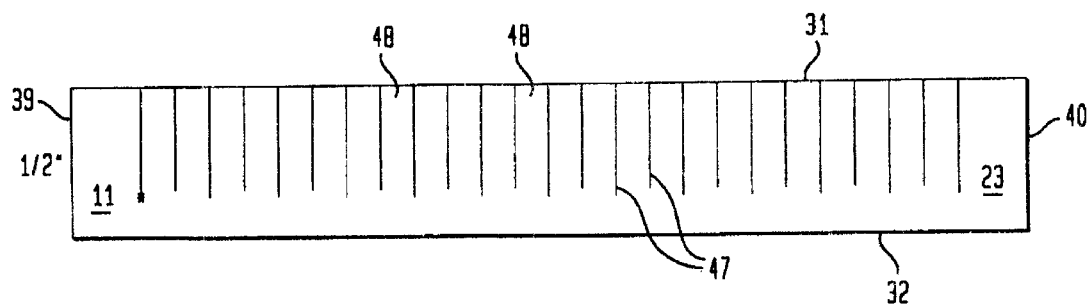
Figure 2C:
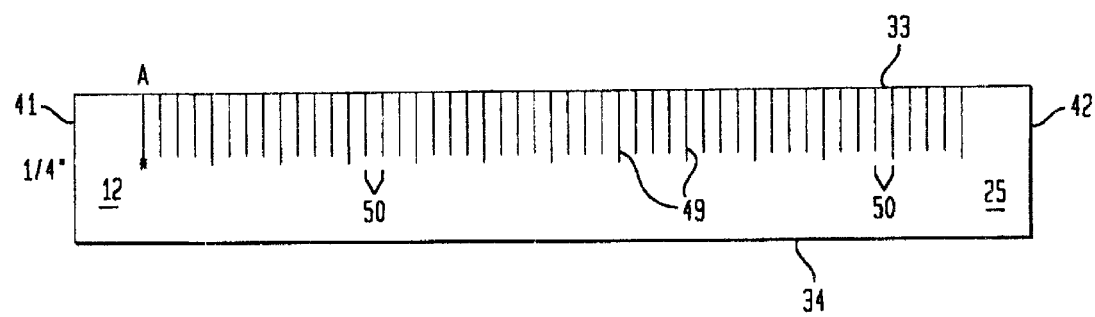
Figure 2D:
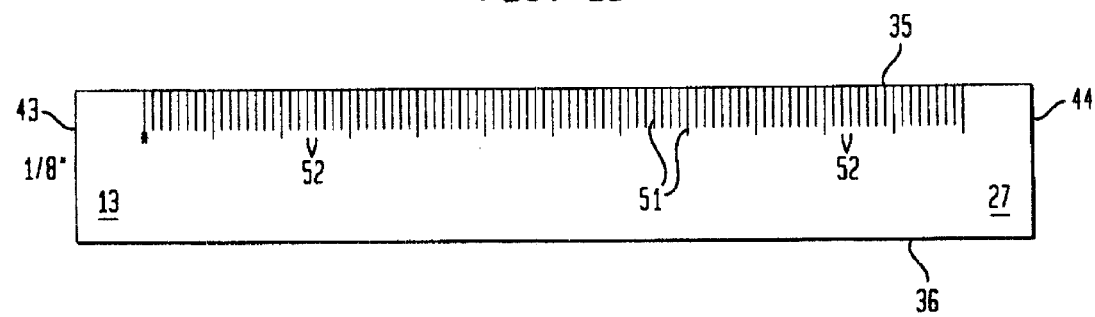
Figure 2E:
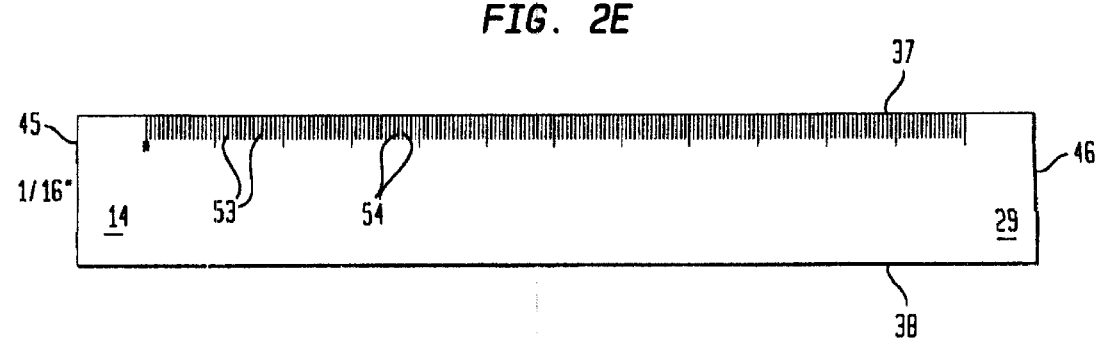
Figure 3:
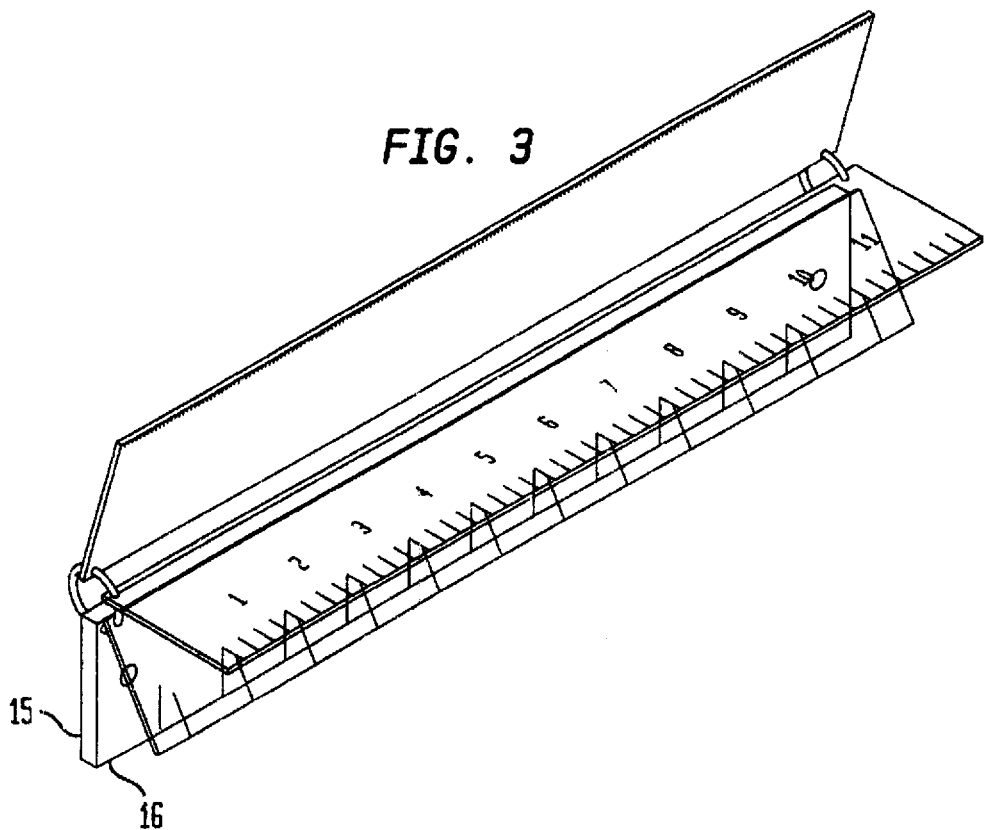
FIG. 3 is an exploded view of said ruler of this invention in operative mode using the components of FIG. 1, 2b,2c,2d, and 2e.
Figure 4:
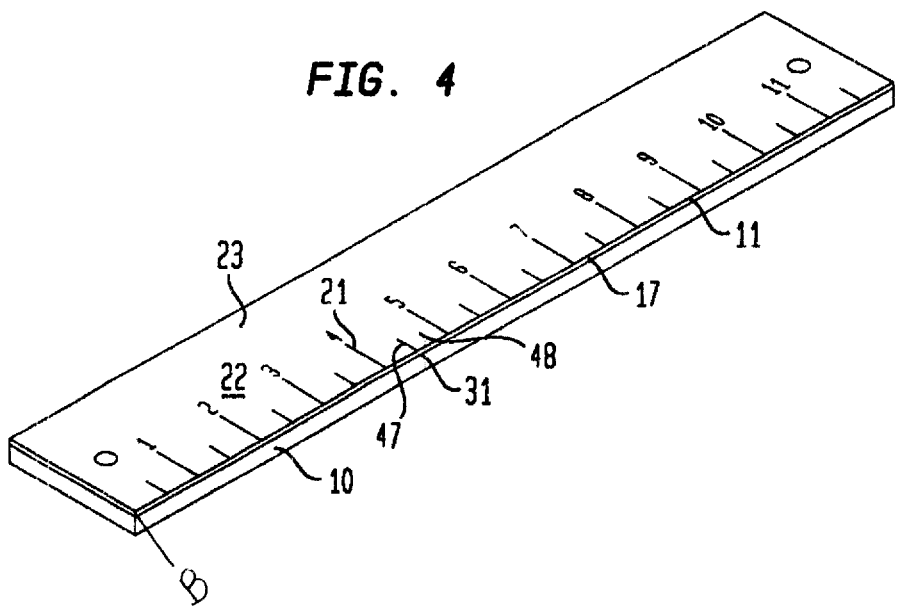
FIG. 4 is an alternative embodiment of said base panel from FIG. 1 and said transparent sheet 2b from FIG. 2.

Referring to FIGS. 1–6, a ruler device of this invention is shown comprised of a base panel 10 and multiple top sheets 11, 12, 13, 14, all panels being of substantially integral monolithic construction, the base panel having been fabricated of wood, cardboard, transparent or opaque plastic sheet stock, the multiple top sheets having been fabricated of transparent plastic sheet stock.

Base panel 10 having upper and lower faces 15 and 16, respectively, having an elongated rectangular perimeter bounded by parallel straight upper and lower long edges 17 and 18, respectively, and straight short leading and trailing edges 19 and 20 respectively. Said upper face of base panel is provided with numbered linear rulings 21 perpendicularly disposed to upper long edge 17 and defining said standard unit of measure subdivision regions 22 having visual indicia delineated thereon.

In the illustrated embodiment said standard units of measure are inch units. In other embodiments said standard units of measure may be metric.

In other embodiments lower long edge 18 of said base panel 10 may be of a curved configuration comprising one or more circular openings.

Top sheets 11, 12, 13, 14, having flat upper and lower faces 23, 24, 25, 25, 26, 27, 28, 29, 30, respectively have elongated rectangular perimeter bounded by parallel straight upper and lower long edges 31, 32, 33, 34, 35, 36, 37, 38, and straight short leading and trailing edges 39, 40, 41, 42, 43, 44, 45, 46, respectively.

Said upper face 23 is provided with solid linear rulings 47 perpendicularly disposed to upper long edge 31, and defining ½" wide subdivision regions 48.

Said upper face 25 is provided with solid linear rulings 49 perpendicularly disposed to upper long edge 33 and defining ¼" wide subdivision regions 50.

Said upper face 27 is provided with linear rulings 51 perpendicularly disposed to upper long edge 35 and defining ⅛" wide subdivision regions 52.

Said upper face 29 is provided with linear ruling 53 perpendicularly disposed to upper long edge 37 and defining 1/16" subdivision regions 54.

In the embodiment shown in FIG. 2 the linear rulings 21, 47, 49, 51, 53 on upper faces 15, 23, 25, 27, 29, respectively define said subdivision regions of 1" (10), ½" (48), ¼" (50), ⅛" (52), 1/16" (54), respectively. In other embodiments the linear rulings may define subdivision regions of decimeter, centimeter, and millimeter.

Said linear markings 21, 47, 49, 51, 53, are of sequentially decreased length corresponding to said standard unit of measure and it's fractional increment thereof. Linear marking 21 being the longest in length. Linear marking 47 being shorter than linear marking 21. Linear marking 49 being shorter that linear marking 47. Linear marking 51 being shorter than marking 49. Linear marking 53 being shorter than linear marking 51.

Linear markings in other embodiments will be of sequentially decreased length corresponding to said standard unit of measure and fractional increments thereof.

Said linear markings 21, 47, 49, 51, 53, are of clearly distinct variant colors. Linear markings 21 are of one color, clearly distinguishable from said colors of linear markings 47, 49, 51, and 53. Linear markings 47 are of another different color clearly distinguishable from said colors of linear markings 21, 49, 51, and 53. Linear markings 49 are of still another different color clearly distinguishable from said colors of linear markings 21, 47, 51, and 53. Linear markings 51 are of a further different color clearly distinguishable from said color of linear marking 21, 47, 49, and 53. Linear markings 53 are of one further different color clearly distinguishable from said color of linear markings 21, 47, 49, and 51.

Said standard unit of measure subdivision regions will be delineated within linear markings 47, 49, 51, 53, of said transparent sheets 11, 12, 13, 14 by means of a thicker linear marking of same length and color as said linear markings on said transparent sheets.

In other embodiments said linear markings of said unit of measure and fractional increments thereof may be of distinct variant color and thickness, and clearly distinguishable from each of said other linear markings comprised in said embodiment.

Said transparent sheets are positionable over said base panel so that said delineated fractional increments of said unit of measure may be aligned with said delineated unit of measure to demonstrate the relationship between unit of measure and the fractional increments thereof Said base panel 10 and said base panel sheets 11, 12, 13, 14, may be secured by means of rivets, ring binders, conventional book binding, heat laminating, living hinge, snaps, velo binding, velcro, repositionable adhesive, or any other means by which two or more parts of an item can be bound. Said base panel 10 and said transparent sheets 11, 12, 13, 14, may not be bound. Said base panel 10 may be used independently or in conjunction with said transparent sheets 11, 12, 13, 14, in any various combinations.

In use, said base panel as shown in FIG. 1 may and can be presented independently. The user positions object on zero line indicia (denoted with visual indicia A in FIG. 1, B as in FIG. 4), then measures to the nearest whole standard unit of measure.

Said transparent sheet 11, can/may then be positioned over said base panel 10 so that said fractional linear markings on said transparent sheet and said standard unit of measure linear markings on said base panel are aligned beginning with zero line indicia A on base panel 10 and zero line indicia B on transparent sheet 11. User positions object on zero line indicia and measures to nearest fractional increment of said standard unit of measure.

This procedure may/can be repeated until user has positioned said transparent sheets 12, 13, 14, over said base panel 10 and said transparent sheet 11.

While particular examples of the present invention have been shown and described, it is apparent that changes in modifications may be made therein without departing from the invention in it's broadest aspects. The aim of the appended claims, therefore, is to cover all such changes and modifications as fall within the true spirit and scope of the invention.

Having thus described by invention, what is claimed is:

1. A measuring and instructional ruler comprised of:
 a) a base panel having a top surface and a bottom surface, and an elongated rectangular perimeter bounded by upper and lower long edges and leading and trailing short edges, said top surface having evenly spaced apart linear rulings perpendicularly disposed to said upper long edge and defining a standard unit of measure (delineated thereon); and b) (at least one) a top transparent sheet having a top surface and a bottom surface and an elongated rectangular perimeter bounded by upper and lower long edges and leading and trailing short edges, said top transparent sheet top surface having evenly spaced apart linear rulings perpendicularly disposed to said upper long edge of said top transparent sheet and defining fractional increments of said standard unit of measure (delineated thereon).

2. The ruler of claim 1 wherein said standard unit of measure is an English unit.

3. The ruler of claim 1 wherein said standard unit of measure is an metric unit.

4. The ruler of claim 1 wherein said base panel is transparent.

5. The ruler of claim 1 wherein said top transparent sheet is secured to said base sheet.

6. The ruler of claim 5 wherein said top transparent sheet is secured by being bound to said base sheet.

7. The ruler of claim 1, wherein said top surface of said base panel has a first alignment indicia, and the top surface of said top sheet has a second alignment indicia, wherein said fractional increments of said standard unit of measure on said top sheet are aligned with said standard units of measure on said base panel by alignment of said first alignment indicia with said second alignment indicia.

8. The ruler of claim 1, wherein said top surface of said secured to said base panel.

9. The ruler of claim 8, wherein said top sheet is secured to said base panel, so that when said top sheet is positioned over said base panel, said fractional increments of said standard unit of measure on said top sheet are in alignment with said standard units of measure on said base panel.

10. The ruler of claim 1, comprising (a plurality of) at least one additional transparent (sheets,each) sheet having a top surface and a bottom surface and an elongated rectangular perimeter bounded by upper and lower long edges and leading and trailing short edges, each additional transparent sheet top surface having evenly spaced apart lines perpendicularly disposed to the upper long edge of each additional transparent sheet, and defining different fractional increments of said standard unit of measure (delineated thereon); so that each additional transparent sheet is positionable between said base panel and said top transparent sheet so that said upper long edge of each additional transparent sheet may be aligned with said upper long edge of said base panel and said upper long edge of said top transparent sheet with said additional transparent sheet linear rulings being visible through said top transparent sheet to demonstrate the relationship between said unit of measure on said base panel and said fractional increments on said top transparent sheet and on said additional transparent sheets.

11. The ruler of claim 10 wherein each said additional transparent sheet is independently positionable over said base panel.

* * * * *